US012648045B2

(12) United States Patent
Wang et al.

(10) Patent No.: US 12,648,045 B2
(45) Date of Patent: Jun. 2, 2026

(54) CONTROL METHOD FOR REALIZING MANIPULATION OF BLUETOOTH HEADSET AND INTERCOM NETWORK

(71) Applicant: Shenzhen Asmax Infinite Technology Co., Ltd., Shenzhen (CN)

(72) Inventors: Peng Wang, Shenzhen (CN); Cheng Luo, Shenzhen (CN); Xiaohong Zhang, Shenzhen (CN)

( * ) Notice: Subject to any disclaimer, the term of this patent is extended or adjusted under 35 U.S.C. 154(b) by 309 days.

(21) Appl. No.: 18/582,865

(22) Filed: Feb. 21, 2024

(65) Prior Publication Data

US 2024/0324048 A1 Sep. 26, 2024

(30) Foreign Application Priority Data

Mar. 20, 2023 (CN) .......................... 202310271738.0

(51) Int. Cl.
*H04W 76/20* (2018.01)
*H04W 4/02* (2018.01)
*H04W 4/38* (2018.01)

(52) U.S. Cl.
CPC ........... *H04W 76/20* (2018.02); *H04W 4/027* (2013.01); *H04W 4/38* (2018.02)

(58) Field of Classification Search
CPC ....... H04W 76/20; H04W 4/027; H04W 4/38; H04W 4/80; Y02D 30/70; H04R 1/10; H04R 2201/10
USPC ................................. 455/41.2, 39, 41.1, 41.3
See application file for complete search history.

(56) References Cited

U.S. PATENT DOCUMENTS

2022/0078584 A1* 3/2022 Chen ........................ H04W 4/80
2023/0217515 A1* 7/2023 Deng .................... H04W 76/14
455/41.1
2025/0168906 A1* 5/2025 Bao ........................ H04W 76/10

FOREIGN PATENT DOCUMENTS

CN 102833644 A * 12/2012

OTHER PUBLICATIONS

First notice of examination opinions (Translated) dated Jun. 30, 2025 for application CN 202310271738 (Year: 2025).*

* cited by examiner

*Primary Examiner* — Juan A Torres

(57) ABSTRACT

A control method for realizing manipulation of Bluetooth headset and intercom network is disclosed. Where the Bluetooth headset is configured with a sensor and a Bluetooth RF module, and the sensor is configured to, detect acceleration values of x-axis, y-axis and z-axis in real time; identify a change of the acceleration values as a specific operation action in response to the acceleration values of one or more axes of the x-axis, y-axis and z-axis exceeds a threshold value; and turn on a corresponding operation of the Bluetooth headset. When the threshold value is a first threshold value, the Bluetooth headset turns on a Bluetooth pairing function. When the threshold value is a second threshold value, the Bluetooth headset turns on a Bluetooth teaming function. The control method can realize fast and accurate control of pairing and intercom functions of the Bluetooth headset, and thereby enhancing effect of a user's experience.

6 Claims, 1 Drawing Sheet

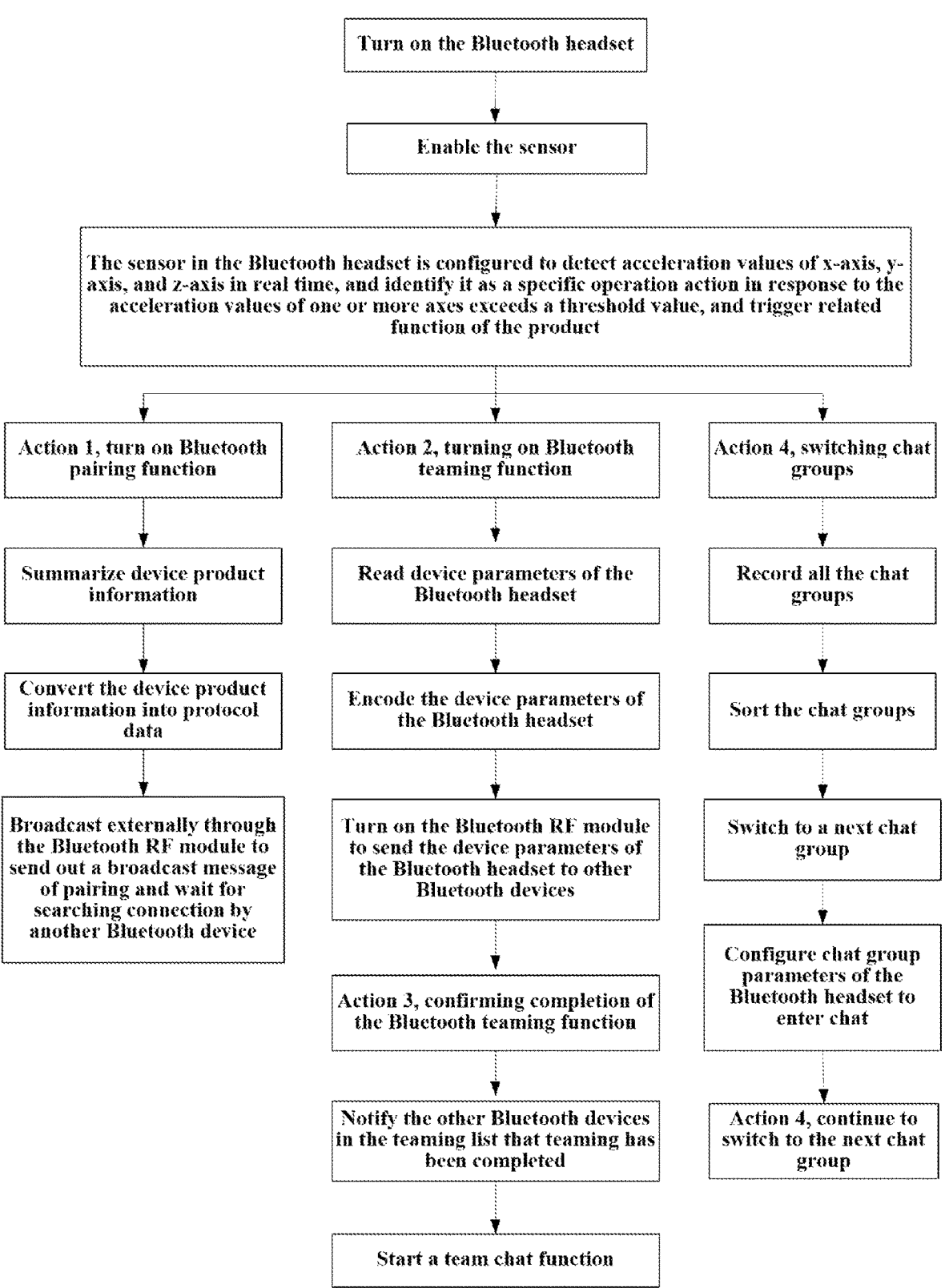

CONTROL METHOD FOR REALIZING MANIPULATION OF BLUETOOTH HEADSET AND INTERCOM NETWORK

TECHNICAL FIELD

The present application relates to the technical field of Bluetooth communication, and in particular to a control method for realizing manipulation of Bluetooth headset and intercom network.

BACKGROUND

Bluetooth headsets have a wide range of applications, there are a variety of categories of Bluetooth headsets, and different application scenarios have different functional requirements for Bluetooth headsets. When requirements for sound quality are different, they are often divided into mono-, multi-channel Bluetooth headsets, and there are also more powerful true wireless Bluetooth headsets, which may realize wireless connection between left and right ears. For field application scenarios, an endurance of Bluetooth is required to be high, so there are many different kinds of Bluetooth headsets, and there will be different types of Bluetooth headsets for different application scenarios.

In existing technologies, a control for a Bluetooth headset is usually done through cell phone terminals or tablet computers and other intelligent devices to complete the control, such as completing the cell phone pairing function, disconnect function, etc., or through buttons set on the Bluetooth headset to control, such as volume control function, pause function, these control methods are more complicated to operate. Nowadays, for Bluetooth headset pairing and networking and other operations, are generally through the buttons or App to operate, that is, most of functions have to be completed by means of intelligent terminals. However, control functions that may be realized on the Bluetooth headset are relatively small, and it is needs to be connected to App of the cell phone or priority of the buttons combination operation to realize, which is extremely inconvenient, especially can't realize a quick operation of a connection function for the Bluetooth headset, thereby affecting efficiency of use, and an accuracy of the control needs to be improved. In addition, phenomena of mishandling will often occur, which may affect a user's experience.

In view of these, the present disclosure provides a control method for realizing manipulation of Bluetooth headset and intercom network, which can reduce difficulty of operation and accurately realize the control functions.

SUMMARY

Embodiments of the present disclosure aims to provide a control method for realizing manipulation of Bluetooth headset and intercom network, which can quickly and accurately control pairing and intercom functions of the Bluetooth headset, and thereby enhancing effect of the user's experience.

Objectives of the present disclosure are achieved by adopting following technical solutions.

In some embodiments of the present disclosure, a control method for realizing manipulation of Bluetooth headset and intercom network is provided. Herein the Bluetooth headset is configured with a sensor and a Bluetooth RF module. And the sensor is configured to, detect acceleration values of x-axis, y-axis and z-axis in real time; identify a change of the acceleration values as a specific operation action in response to the acceleration values of one or more axes of the x-axis, y-axis and z-axis exceeds a threshold value; and turn on a corresponding operation of the Bluetooth headset. Herein the threshold value includes a first threshold value, a second threshold value, and a third threshold value. The specific operation action includes a first operation action, a second operation action, a third operation action, and a fourth operation action.

Specifically, in some embodiments of the present disclosure, the control method for realizing manipulation of Bluetooth headset and intercom network includes following operations OP1, OP2, and OP3.

OP1, identifying the change of the acceleration values as the first operation action in response to any one of the acceleration values of the x-axis, y-axis and z-axis exceeds the threshold value; turning on a Bluetooth pairing function of the Bluetooth headset to summarize device product information and convert it into protocol data; and then broadcasting externally through the Bluetooth RF module to send out a broadcast message of pairing and wait for searching connection by another Bluetooth device.

OP2, identifying the change of the acceleration values as the second operation action in response to a sum of coaxial acceleration values or heteraxial acceleration values in the acceleration values of the x-axis, y-axis and z-axis exceeds the second threshold value during a period of time and the second threshold being greater than the first threshold value; turning on a Bluetooth teaming function of the Bluetooth headset to first read device parameters of the Bluetooth headset and encode the device parameters of the Bluetooth headset; turning on the Bluetooth RF module to send the device parameters of the Bluetooth headset to other Bluetooth devices; receiving parameters of the other Bluetooth devices to add them to a teaming list of the Bluetooth headset and wait for next operation; identifying the change of the acceleration values as the third operation action in response to any one of acceleration values in the x-axis, y-axis and z-axis exceeds the first threshold value; confirming completion of the Bluetooth teaming function of the Bluetooth headset; and broadcasting externally to notify the other Bluetooth devices in the teaming list that teaming has been completed; and then starting a team chat function.

OP3, identifying the change of the acceleration values as the fourth operation action in response to the sum of the coaxial acceleration values or the heteraxial acceleration values in the acceleration values of the x-axis, y-axis and z-axis exceeds the third threshold value during a period of time and the third threshold value being greater than the second threshold; switching chat groups of the Bluetooth headset to record all chat groups of the Bluetooth headset; sorting the chat groups of the Bluetooth headset; performing an operation of switching to a next chat group; and then configuring chat group parameters of the Bluetooth headset to enter the next chat group.

In some embodiments of the present disclosure, the coaxial acceleration values are the acceleration values accumulated in the x-axis, the acceleration values accumulated in the y-axis, or the acceleration values accumulated in the z-axis, during a period of time.

In some embodiments of the present disclosure, the heteraxial acceleration values are the acceleration values accumulated in the x-axis and y-axis, the acceleration values accumulated in the x-axis and z-axis, the acceleration values accumulated in the y-axis and z-axis, or the acceleration values accumulated in the x-axis, y-axis and z-axis, during a period of time.

In some embodiments of the present disclosure, the fourth operation action does not switch the chat groups on the Bluetooth headset in response to there is only one chat group in the Bluetooth headset.

In some embodiments of the present disclosure, the sensor is configured to detect the acceleration values in the x-axis, y-axis, and z-axis in real time. And the control method further includes operations of setting a valid threshold interval and a real-time detection period, and during the real-time detection period, taking real-time acceleration values of the x-axis, y-axis, and z-axis as valid threshold values in response to the acceleration values of the x-axis, the y-axis, and the z-axis are within the valid threshold interval, and recording the acceleration values of the x-axis, the y-axis, and the z-axis as current valid acceleration values; alternatively, taking the real-time acceleration values of the x-axis, y-axis, and z-axis as invalid acceleration values in response to the acceleration values of the x-axis, the y-axis, and the z-axis are outside the valid threshold interval, and recording the acceleration values of the x-axis, the y-axis, and the z-axis as 0 value.

In some embodiments of the present disclosure, an interval period is set between two adjacent real-time detection cycles.

The control method of embodiments of the present disclosure, by setting the sensor in the Bluetooth headset to detect the acceleration values of the sensor, by determining the threshold value to trigger different operation actions and simplify the operation method to complete relevant operations, by setting the threshold value to accurately identify intention of the operations, which can achieve effect of accurate control and there will be no misoperation phenomenon, thereby enhancing effect of the user's product experience. Meanwhile, the control method of embodiments of the present disclosure also can reduce requirements in terms of operating difficulty, enabling easier control of the Bluetooth headset's pairing and intercom functions.

BRIEF DESCRIPTION OF THE DRAWINGS

FIG. 1 is a flow chart of a control method for realizing manipulation of Bluetooth headset and intercom network in accordance with some embodiments of the present disclosure.

DETAILED DESCRIPTION OF THE EMBODIMENTS

In order to make the objectives, technical solutions and advantages of the present disclosure more clearly and understood, the present disclosure will be described in further detail hereinafter in conjunction with accompanying drawings and embodiments. It should be understood that specific embodiments described herein are intended only to explain the present invention and are not intended to limit the present invention.

In some embodiments of the present disclosure, a control method for realizing manipulation of Bluetooth headset and intercom network is provided. Herein the Bluetooth headset is configured with a sensor and a Bluetooth RF module. And the sensor is configured to, detect acceleration values of x-axis, y-axis and z-axis in real time; identify a change of the acceleration values as a specific operation action in response to the acceleration values of one or more axes of the x-axis, y-axis and z-axis exceeds a threshold value; and turn on a corresponding operation of the Bluetooth headset. Herein the threshold value includes a first threshold value, a second threshold value, and a third threshold value. The specific operation action includes a first operation action, a second operation action, a third operation action, and a fourth operation action.

In some embodiments of the present disclosure, the control method for realizing manipulation of Bluetooth headset and intercom network includes following operations OP1, OP2, and OP3.

OP1, identifying the change of the acceleration values as the first operation action in response to any one of the acceleration values of the x-axis, y-axis and z-axis exceeds the threshold value; turning on a Bluetooth pairing function of the Bluetooth headset to summarize device product information and convert it into protocol data; and then broadcasting externally through the Bluetooth RF module to send out a broadcast message of pairing and wait for searching connection by another Bluetooth device.

OP2, identifying the change of the acceleration values as the second operation action in response to a sum of coaxial acceleration values or heteraxial acceleration values in the acceleration values of the x-axis, y-axis and z-axis exceeds the second threshold value during a period of time and the second threshold being greater than the first threshold value; turning on a Bluetooth teaming function of the Bluetooth headset to first read device parameters of the Bluetooth headset and encode the device parameters of the Bluetooth headset; turning on the Bluetooth RF module to send the device parameters of the Bluetooth headset to other Bluetooth devices; receiving parameters of the other Bluetooth devices to add them to a teaming list of the Bluetooth headset and wait for next operation; identifying the change of the acceleration values as the third operation action in response to any one of acceleration values in the x-axis, y-axis and z-axis exceeds the first threshold value; confirming completion of the Bluetooth teaming function of the Bluetooth headset; and broadcasting externally to notify the other Bluetooth devices in the teaming list that teaming has been completed; and then starting a team chat function.

OP3, identifying the change of the acceleration values as the fourth operation action in response to the sum of coaxial acceleration values or the heteraxial acceleration values in the acceleration values of the x-axis, y-axis and z-axis exceeds the third threshold value during a period of time and the third threshold value being greater than the second threshold; switching chat groups of the Bluetooth headset to record all the chat groups of the Bluetooth headset; sorting the chat groups of the Bluetooth headset; performing an operation of switching to a next chat group; and then configuring chat group parameters of the Bluetooth headset to enter the next chat group.

In some embodiments of the present disclosure, the coaxial acceleration values are the acceleration values accumulated in the x-axis, the acceleration values accumulated in the y-axis, or the acceleration values accumulated in the z-axis, during a period of time.

In some embodiments of the present disclosure, the heteraxial acceleration values are the acceleration values accumulated in the x-axis and y-axis, the acceleration values accumulated in the x-axis and z-axis, the acceleration values accumulated in the y-axis and z-axis, or the acceleration values accumulated in the x-axis, y-axis and z-axis, during a period of time.

In some embodiments of the present disclosure, the fourth operation action does not switch the chat groups on the Bluetooth headset in response to there is only one chat group in the Bluetooth headset.

In some embodiments of the present disclosure, the sensor is configured to detect the acceleration values of the x-axis, y-axis, and z-axis in real time. And the control method further includes operations of setting a valid threshold interval and a real-time detection period, and during the real-time detection period, taking real-time acceleration values of the x-axis, y-axis, and z-axis as valid threshold values in response to the acceleration values of the x-axis, the y-axis, and the z-axis are within the valid threshold interval, and recording the acceleration values of the x-axis, the y-axis, and the z-axis as current valid acceleration values; alternatively, taking the real-time acceleration values of the x-axis, y-axis, and z-axis as invalid acceleration values in response to the acceleration values of the x-axis, the y-axis, and the z-axis are outside the valid threshold interval, and recording the acceleration values of the x-axis, the y-axis, and the z-axis as 0 value.

Herein, setting the valid threshold interval is to further prevent changes of acceleration caused by tiny vibration, which leads to the change of acceleration values and easily causes misoperation. When the acceleration values do not reach the valid threshold interval, it defaults to a quiescent state, and all are given 0 value. And when the acceleration values reach the valid threshold interval, it will be regarded as an effective operation, and the acceleration values will be recorded as current acceleration values.

Herein, setting the real-time detection period is to more reasonably detect the effective operation in a cycle, an operation not in a cycle will not affect an acceleration value detection in this cycle, which can avoid misjudgment of the operation actions, thereby operation behavior is more accurately identified.

In some embodiments of the present disclosure, an interval period is set between two adjacent real-time detection cycles.

Herein, setting the interval period makes it easier to identify the operation action between two cycles as a coherent operation. If there is no valid operation in this interval period, the operation is considered incoherent. And if there is a valid operation in this interval period, the operation is considered coherent, which can further accurately identify the coherence of the operation and thereby preventing the operation from being misjudged.

Specific implementations of the present disclosure will be described in detail below in connection with specific embodiments.

As shown in FIG. 1, the Bluetooth headset is first turned on, the sensor is then activated, and the sensor detects the acceleration values of the x-axis, y-axis, and z-axis in real time, and when the acceleration values of one or more axes are greater than the threshold value, it is identified as a special operation action or the specific operation action, then triggering operation functions of the Bluetooth headset.

When it is identified as an action 1, turning on the Bluetooth pairing function of the Bluetooth headset to summarize device product information and convert it into protocol data, broadcasting externally through the Bluetooth RF module to send out a broadcast message of pairing and wait for searching connection by another Bluetooth device. For example, the Bluetooth headset turns on Bluetooth searched function, an external cell phone searches for the Bluetooth headset, pairs it, and then completes the pairing function.

When one or more of the acceleration values of the x-axis, y-axis and z-axis exceeds the preset first threshold value, it is identified as the action 1. Herein sensitivity can be set to exceed at the same time or exceed of different axes within a certain period of time, which is recorded as a single exceedance, and all of them belong to a scope of the action 1.

In a case that assuming the threshold value is 5, when an acceleration value of the x-axis is detected as 6, an acceleration value of the y-axis is 3, and an acceleration value of z-axis is 0, it is identified as the action 1. When the acceleration value of the x-axis is detected as 6, the acceleration value of the y-axis is 6, and the acceleration value of z-axis is 0, it is still identified as the action 1. When the acceleration value of the x-axis is detected as 6, the acceleration value of the y-axis is 6, and the acceleration value of z-axis is 6, it is still identified as the action 1. That is to say, any one of the acceleration values exceeding the threshold value of 5 is identified as the action 1.

When it is identified as an action 2, the Bluetooth headset turns on a Bluetooth teaming function, and through mesh networking way to group, and then completes intercom or mutual communication function. The Bluetooth headset first reads device parameters thereof, encodes the device parameters, turns on the Bluetooth RF module to send the device parameters to other Bluetooth devices, and receives parameters of the Bluetooth other devices and then Bluetooth devices those meet conditions are joined in a team list of the Bluetooth headset. When it is identified as action 3, it confirms completion of teaming, the Bluetooth headset broadcasts externally to notify the other Bluetooth devices in the team list that teaming is completed, and starts a team chat function.

In a case that assuming the threshold value is 20, during a period of time, the acceleration values of the x-axis are detected to be 8 and 7, the acceleration values of the y-axis are detected to be 3 and 2, the acceleration values of the z-axis are detected to be 2 and 1, then the acceleration values accumulated exceeds 20 and it is identified as the action 2. When during a period of time, the acceleration values of the x-axis are detected to be 11 and 10, the acceleration values of the y-axis are detected to be 0 and 0, the acceleration values of the z-axis are detected to be 0 and 0, then the acceleration values accumulated exceeds 20 and it is still identified as the action 2. And it is further identified as an action 3 on the basis of the action 2, and then corresponding operations are performed.

When it is identified as an action 4, the Bluetooth headset perform operation of switching chat groups, records all the chat groups of the Bluetooth headset and sorts the chat groups of the Bluetooth headset, performs operation of switching to a next chat group, configures chat group parameters of the Bluetooth headset and enters the next chat group. If it continues to be identified as the action 4, the operation of switching to the next chat group continues to be performed, and a list of the chat groups constantly switches in order.

In a case that assuming the threshold value is 30, during a period of time, the acceleration values of the x-axis are detected to be 10, 7 and 9, the acceleration values of the y-axis are detected to be 3, 2 and 0, the acceleration values of the z-axis are detected to be 2, 1 and 0, then the acceleration values accumulated exceeds 30 and it is identified as the action 4. During a period of time, the acceleration values of the x-axis are detected to be 10, 11 and 12, the acceleration values of the y-axis are detected to be 0, 0 and 0, the acceleration values of the z-axis are detected to be 0, 0 and 0, then the acceleration values accumulated exceeds 30 and it is still identified as the action 4.

In some embodiments of the present disclosure, the Bluetooth headset is configured with the sensor inside, so as to trigger different operation functions by distinguishing different operations of knocking. And the operation functions can be realized by knocking on a helmet, on a hand, on a desktop, which can increase convenience of operations in different use scenarios. Moreover, by setting the threshold value of the acceleration values, various operation instructions can be identified, thus the Bluetooth headset can be accurately controlled, which can ensure convenience without phenomenon of misoperation.

The foregoing is only some preferred embodiments of the present disclosure, and is not intended to limit the present invention. And any modifications, equivalent substitutions, improvements, etc. made within the spirit and principles of the present invention shall be included in the scope of protection of the present invention.

What is claimed is:

1. A control method for realizing manipulation of Bluetooth headset and intercom network, wherein the Bluetooth headset is configured with a sensor and a Bluetooth RF module; and wherein the sensor is configured to, detect acceleration values of x-axis, y-axis and z-axis in real time;

identify a change of the acceleration values as a specific operation action in response to the acceleration values of one or more axes of the x-axis, y-axis and z-axis exceeds a threshold value; and turn on a corresponding operation of the Bluetooth headset; and wherein the threshold value comprises a first threshold value, a second threshold value, and a third threshold value; and wherein the specific operation action comprises a first operation action, a second operation action, a third operation action, and a fourth operation action; and wherein the control method comprises operations of, OP1, identifying the change of the acceleration values as the first operation action in response to any one of the acceleration values of the x-axis, y-axis and z-axis exceeds the first threshold value;

turning on a Bluetooth pairing function of the Bluetooth headset to summarize device product information and convert it into protocol data; and broadcasting externally through the Bluetooth RF module to send out a broadcast message of pairing and wait for searching connection by another Bluetooth device;

OP2, identifying the change of the acceleration values as the second operation action in response to a sum of coaxial acceleration values or heteraxial acceleration values in the acceleration values of the x-axis, y-axis and z-axis exceeds the second threshold value during a period of time and the second threshold being greater than the first threshold value;

turning on a Bluetooth teaming function of the Bluetooth headset to first read device parameters of the Bluetooth headset and encode the device parameters of the Bluetooth headset;

turning on the Bluetooth RF module to send the device parameters of the Bluetooth headset to other Bluetooth devices;

receiving parameters of the other Bluetooth devices to add them to a teaming list of the Bluetooth headset and wait for next operation;

identifying the change of the acceleration values as the third operation action in response to any one of acceleration values of the x-axis, y-axis and z-axis exceeds the first threshold value;

confirming completion of the Bluetooth teaming function of the Bluetooth headset;

broadcasting externally to notify the other Bluetooth devices in the teaming list that teaming has been completed; and starting a team chat function; and OP3, identifying the change of the acceleration values as the fourth operation action in response to the sum of the coaxial acceleration values or the heteraxial acceleration values in the acceleration values of the x-axis, y-axis and z-axis exceeds the third threshold value during a period of time and the third threshold value being greater than the second threshold;

switching chat groups of the Bluetooth headset to record all the chat groups of the Bluetooth headset;

sorting the chat groups the Bluetooth headset;

performing an operation of switching to a next chat group; and configuring chat group parameters of the Bluetooth headset to enter the next chat group.

2. The control method according to claim 1, wherein the coaxial acceleration values are the acceleration values accumulated in the x-axis, the acceleration values accumulated in the y-axis, or the acceleration values accumulated in the z-axis, during a period of time.

3. The control method according to claim 1, wherein the heteraxial acceleration values are the acceleration values accumulated in the x-axis and y-axis, the acceleration values accumulated in the x-axis and z-axis, the acceleration values accumulated in the y-axis and z-axis, or the acceleration values accumulated in the x-axis, y-axis and z-axis, during a period of time.

4. The control method according to claim 1, wherein the fourth operation action does not switch the chat groups on the Bluetooth headset in response to there is only one chat group in the Bluetooth headset.

5. The control method according to claim 1, wherein the sensor is configured to detect the acceleration values of the x-axis, y-axis, and z-axis in real time; and the control method further comprises operations of, setting a valid threshold interval and a real-time detection period, and during the real-time detection period, taking real-time acceleration values of the x-axis, y-axis, and z-axis as valid threshold values in response to the acceleration values of the x-axis, the y-axis, and the z-axis are within the valid threshold interval, and recording the acceleration values of the x-axis, the y-axis, and the z-axis as current valid acceleration values; alternatively taking the real-time acceleration values of the x-axis, y-axis, and z-axis as invalid acceleration values in response to the acceleration values of the x-axis, the y-axis, and the z-axis are outside the valid threshold interval, and recording the acceleration values of the x-axis, the y-axis, and the z-axis as 0 value.

6. The control method according to claim 5, wherein an interval period is set between two adjacent real-time detection cycles.

* * * * *